(12) United States Patent
Downing

(10) Patent No.: US 7,431,579 B2
(45) Date of Patent: Oct. 7, 2008

(54) CALENDER GAP CONTROL

(75) Inventor: Daniel Ray Downing, Uniontown, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 291 days.

(21) Appl. No.: 10/924,535

(22) Filed: Aug. 24, 2004

(65) Prior Publication Data

US 2006/0043624 A1 Mar. 2, 2006

(51) Int. Cl.
*B28B 17/00* (2006.01)
*B29C 67/20* (2006.01)

(52) U.S. Cl. ............... 425/141; 425/193; 425/194; 425/363; 425/367; 264/40.1; 264/40.5; 264/175; 264/280

(58) Field of Classification Search .................. None
See application file for complete search history.

(56) References Cited

U.S. PATENT DOCUMENTS

| | | | | |
|---|---|---|---|---|
| 3,060,843 A | * | 10/1962 | Moore et al. | 100/41 |
| 3,201,962 A | * | 8/1965 | Hautau | 72/9.4 |
| 3,389,588 A | * | 6/1968 | Reinhardt et al. | 72/10.7 |
| 3,460,015 A | * | 8/1969 | Hines | 318/117 |
| 3,936,258 A | * | 2/1976 | Lake | 425/135 |
| 4,503,626 A | | 3/1985 | Rothenbacher et al. | 34/110 |
| 4,514,161 A | * | 4/1985 | Winter | 425/154 |
| 4,787,835 A | | 11/1988 | Cavanaugh | 425/150 |
| 4,964,202 A | | 10/1990 | Pav et al. | 29/116.2 |
| 5,101,544 A | | 4/1992 | Kubik | 29/116.2 |
| 5,111,564 A | | 5/1992 | Pav et al. | 29/116.2 |
| 5,116,448 A | | 5/1992 | Murayama et al. | 156/250 |
| 5,141,681 A | | 8/1992 | Ramm | 264/40.1 |
| 5,513,560 A | | 5/1996 | Downing et al. | 100/35 |
| 5,932,069 A | | 8/1999 | Kuosa et al. | 162/199 |
| 6,280,548 B1 | | 8/2001 | Benzing, II et al. | 156/133 |
| 6,330,024 B1 | | 12/2001 | Vargo et al. | 348/86 |
| 6,468,461 B1 | | 10/2002 | Sumiyoshi et al. | 26/280 |

FOREIGN PATENT DOCUMENTS

DE 3014891 10/1981
DE 4209712 9/1992

* cited by examiner

*Primary Examiner*—Mark Eashoo
*Assistant Examiner*—Jeffrey Wollschlager
(74) *Attorney, Agent, or Firm*—June E. Rickey

(57) ABSTRACT

A method and apparatus for a calendering system is provided to allow for fine gauge adjustment of the product. The calender system has a first and second roller each having a first and second end mounted in opposed end supports. The end supports each have an inlet and an outlet in fluid communication with one or more internal passages, wherein a heat transfer medium may be circulated through the one or more internal passages. The heat transfer medium may either heat or cool the internal passages of the end supports, resulting in the respective increase or decrease in the gauge of the product.

8 Claims, 4 Drawing Sheets

CALENDER GAP CONTROL

FIELD OF THE INVENTION

The present invention relates in general to calender systems, and more specifically to calender systems having a fine gauge adjustment.

BACKGROUND OF THE INVENTION

Calendering systems are often used by manufacturers to process textiles, paper or rubber in various stages of the tire making process. Many prior art systems lack the capability to fine tune the gauge of the part being calendered. Typically the control of the gauge is done through adjusting the distance between the centerlines of the calender rolls. One way to accomplish this is by varying the temperature of the calender rolls, by either heating or cooling the rolls. However, this method has the disadvantage of affecting the processing of the rubber by adversely moving away from the optimal roll temperature. Another method of controlling the gauge is by running a draw or by changing the draw so that one roll spins faster than the other roll. However, this method has the disadvantage of causing additional stress to the rubber, which contributes to distortion and snap back. Another method of controlling the gauge is by machining the calender roll to decrease its diameter, thereby increasing the gauge. This method is time consuming and costly, and can only increase the gauge of the part, not decrease it.

Thus an improved method and apparatus is desired which allows the fine adjustment of the calender gap so that the gauge of the component can be adjusted.

SUMMARY OF THE INVENTION

The invention provides in a first aspect a calender system for processing a product to produce a desired gauge thickness, the calender system having a fine gauge adjustment, the calender system comprising: a first and second roller each having a first and second end mounted in opposed end supports, said end support each having an inlet and an outlet in fluid communication with one or more internal passages, wherein a heat transfer medium may be circulated through said one or more internal passages.

The invention provides in another aspect a method of adjusting a calender system having two or more rollers. The method comprises the steps of: determining the desired gauge of the end product, determining the actual gauge of the end product, circulating a heat transfer fluid in one or more internal passages of the end support plates of the rollers, and adjusting the temperature of the heat transfer medium until the desired gauge has been reached.

BRIEF DESCRIPTION OF THE DRAWINGS

The invention will be described by way of example and with reference to the accompanying drawings in which.

DETAILED DESCRIPTION OF THE INVENTION

Figure 1:
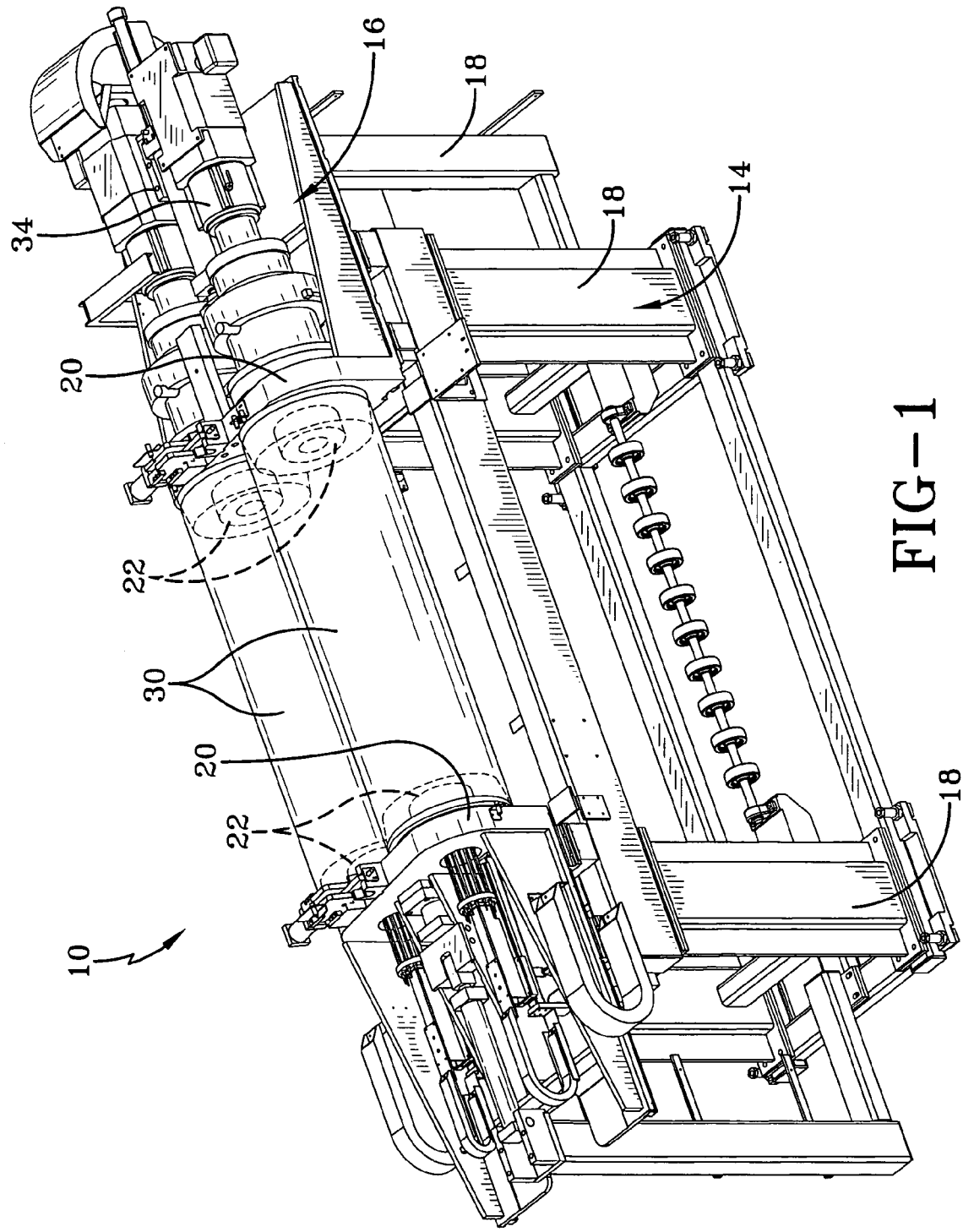
FIG. 1 is a perspective view of a calendering system.
Figure 2:
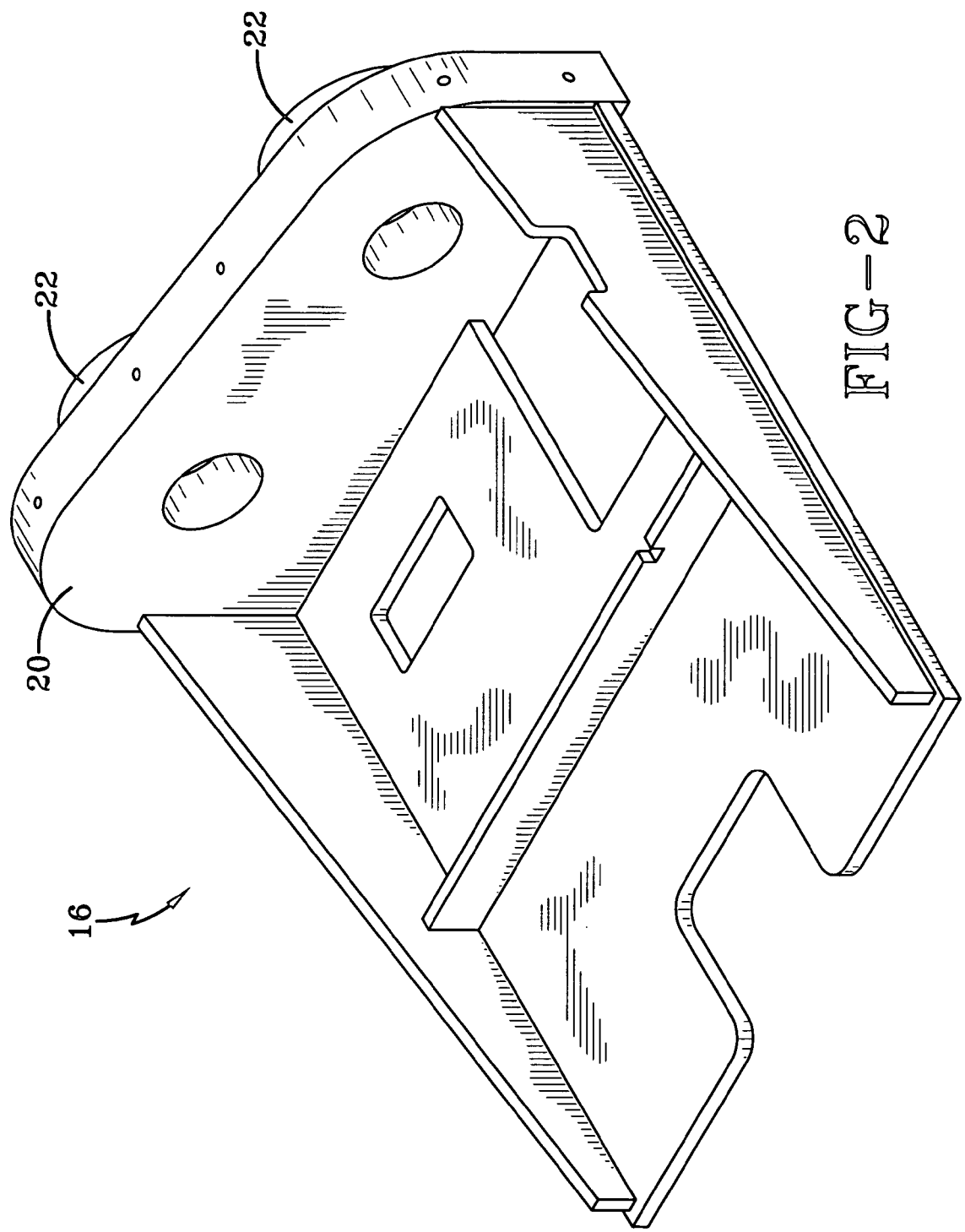
FIG. 2 is an end view of the end support of the upper frame of the calender system of FIG. 1.
Figure 4:
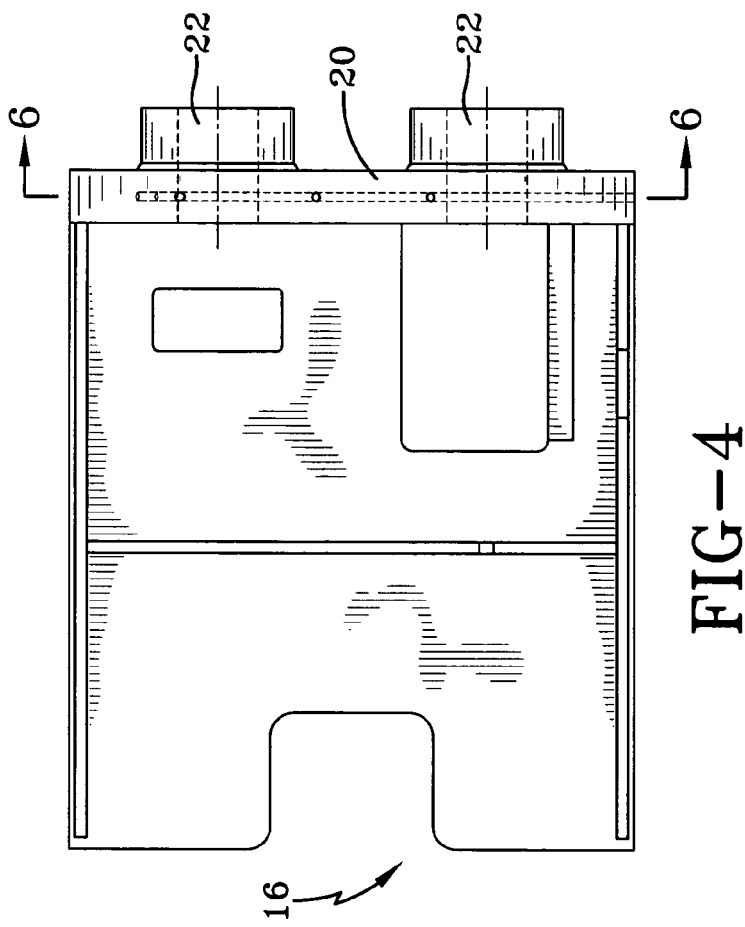
FIG. 4 is a top view of the frame of FIG. 2.
Figure 5:
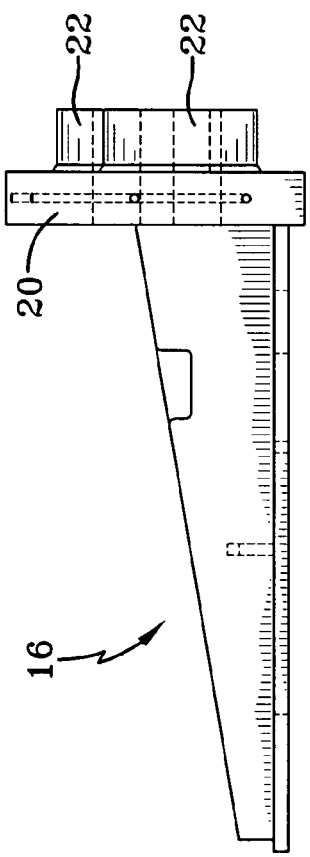
FIG. 5 is a side view of the end support of FIG. 2.
Figure 3:
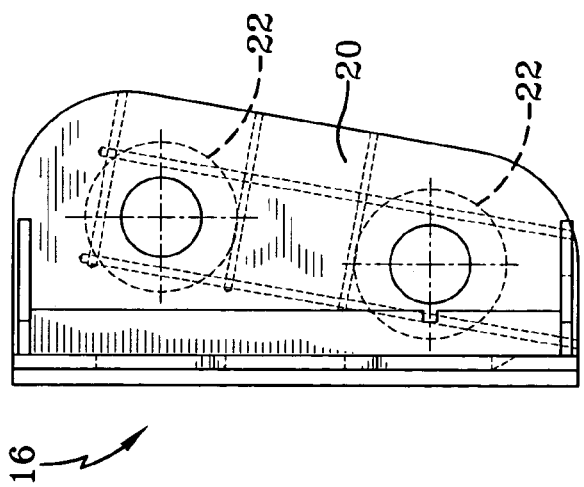
FIG. 3 is an end view of the end support of FIG. 2.
Figure 6:
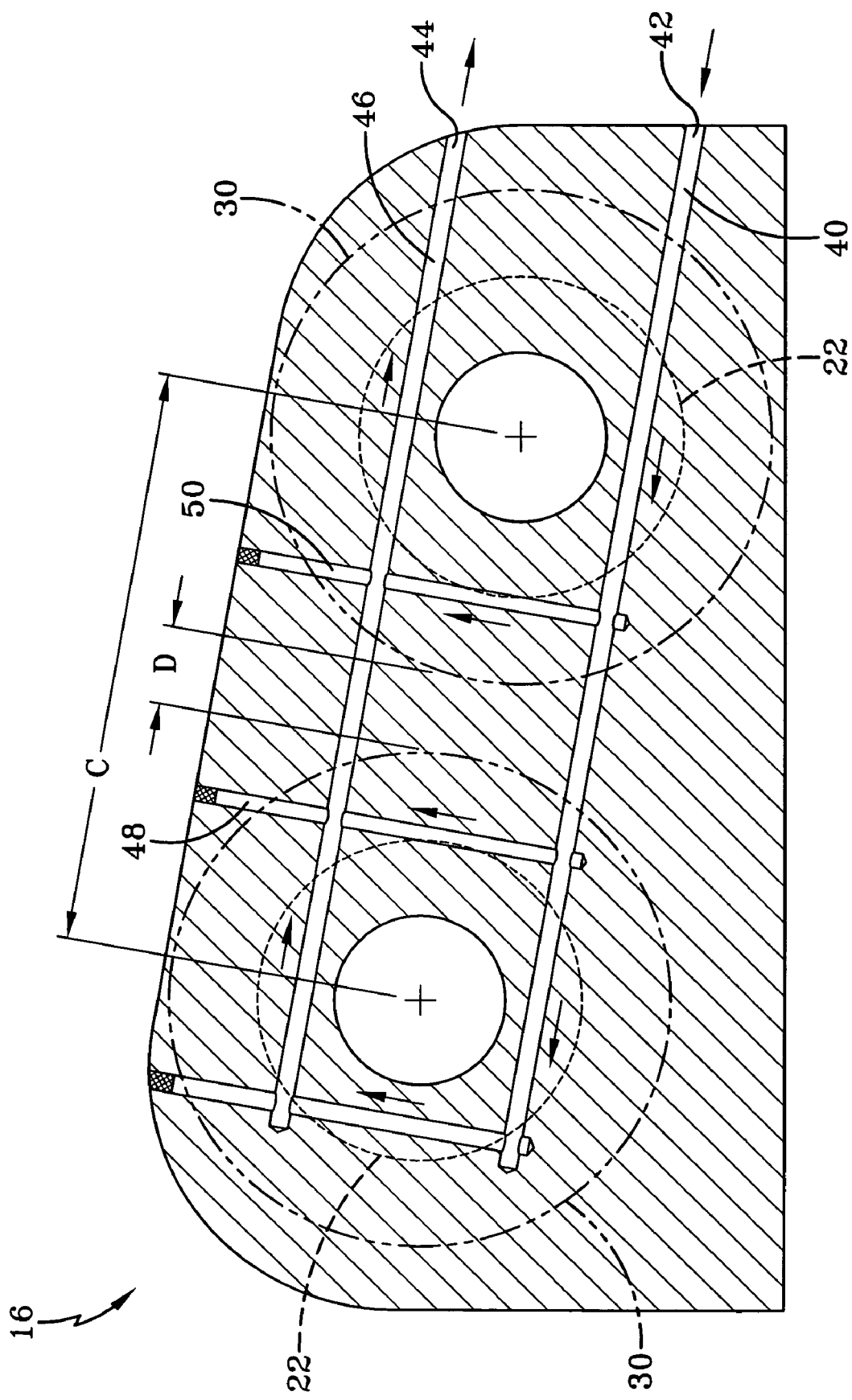
FIG. 6 is a cross-sectional view of the end support taken in the direction 6-6 of FIG. 4.

Turning to the drawings and in particular FIGS. 1-4, there is illustrated a calendering system 10 embodying improvements especially suited for calendering rubber, although the invention is applicable to other applications. The calendering system comprises a frame 12 including a lower frame 14, and an upper frame 16 mounted to the lower frame. The lower frame 14 includes a plurality of support legs 18. The upper frame 16 is connected to the lower frame 14 and includes two opposed end supports 20 for supporting a pair of rollers 30. One of the end supports 20 is fixed to the upper frame 16, while the opposite end support 20' is preferably slidably mounted to the upper frame, to allow for adjustment. Each end support 20 further comprises a pair of rotatable hubs 22 mounted in parallel alignment, which are aligned with the rotatable hubs on the opposed end support for supporting a roller 30. Each hub 22 is received in an end of the roller. One of the hubs 22 for each roller 30 is connected to a drive shaft (not shown) which is driven by a motor 34. Each roller 30 may be rotated in the same or opposite direction of the adjacent roller, and at the same or different speeds.

Thus, there are two rollers 30 mounted in parallel alignment, and spaced closely apart a gap distance d. The present invention concerns the fine adjustment of the gap distance d, by precise adjustment and control of the distance C located between the centers of the rollers. In order to adjust the gap distance d, each end support 20 comprises one or more internal passages 40 for circulating a heat transfer medium such as water. The one ore or more internal passages 40 further comprise an inlet 42 and an outlet 44, so that the heat transfer medium may be circulated in an open loop through the end support 20. The one or more internal passages 40 are preferably located between the two centers of the rolls 30. Preferably, there are two sets of passages located between the roll centers, wherein one set of passages 40,46 run in a first direction, while a second set of passages 48,50 extend in a second direction different than the first direction. Preferably, the passages are strategically placed so that the end support is responsive to temperature changes, and that there is a minimal temperature gradient over the entire end support.

The heat transfer medium may be heated or cooled to the desired temperature prior to circulation within the end supports. If it is desired to increase or decrease the gap distance d between the rolls, then the heat transfer medium may be heated or cooled, respectively. As the heat transfer medium travels through the one or more internal passages, the end support contracts or expands due to the temperature change. As the end support contracts or expands, the distance between the centers of the rolls also likewise contracts or expands, depending upon whether the heat transfer medium is cooling or heating the end support. Precise control of the gap distance may be achieved by controlling the temperature of the heat transfer medium.

The temperature of the heat transfer medium is preferably controlled by a temperature control unit (not shown) which is in electrical communication with a control mechanism (not shown). The desired gap distance or gauge of the material may be programmed into the controller. An active feedback loop may be utilized by the controller to maintain the gauge of the material by slightly varying the temperature of the heat transfer fluid. Thus for example, by varying the temperature of the heat transfer medium from 80 to 160 degrees F., the gauge of the component may be varied up to 0.015 inch.

The change in the gap distance d has a linear relationship with the coefficient of thermal expansion and the change in temperature of the end support plate, and is represented by the equation below.

$$\text{Change in gap distance d (inches)} = \alpha * L * \Delta T,$$

Where: $\alpha$ is the coefficient of thermal expansion inch/(inch deg F)

L is the distance between the centers of the rolls, in inches $\Delta T$ (deg F) is the change in temperature of the end support plate.

In a second embodiment of the invention (not shown), the end support may be heated by any other devices known to those skilled in the art, such as dielectric heating, radiant heating, induction heating or any other heating or cooling method known to those skilled in the art.

In a third embodiment of the invention, each end support may be independently heated to different temperatures to counteract any undesired asymmetries in the produced part, or produce desired asymmetries in the produced part. For example, one side of the machine may be slightly different than the other side of the machine due to build up of machine tolerances.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A calender system for processing a product to produce a desired gauge thickness, the calender system having a gauge adjustment, the calender system comprising: a frame having two opposed end supports, a first and second roller each having a first and second end mounted in rotatable supports, wherein each of said rotatable supports is positionally fixed to one of said end supports, said end supports each having an inlet and an outlet in fluid communication with one or more internal passages, wherein a portion of the one or more internal passages is located between the centers of the rollers, wherein a heat transfer medium may be circulated through said one or more internal passages.

2. The calender system of claim 1, wherein substantially all of the one or more internal passages are located between the centerlines of the first and second rollers.

3. The calender system of claim 1 wherein said internal passages extend the length of the end supports.

4. The calender system of claim 1 wherein the heat transfer medium is water.

5. The calender system of claim 1 wherein a portion of the one or more internal passages are aligned parallel to a line joining the centers of the rollers.

6. The calender system of claim 1 further comprising a plurality of internal passages, wherein one of said passages is axially aligned in a first direction, while a second internal passage is axially aligned in a direction different than said first direction.

7. The calender system of claim 1 wherein said first end support is heated to a different temperature than said second end support.

8. The calender system of claim 1 wherein said end supports each having a longitudinal axis transverse to the longitudinal axes of said first and second rollers.

* * * * *